United States Patent
Hodges et al.

(10) Patent No.: US 9,566,827 B2
(45) Date of Patent: Feb. 14, 2017

(54) TIRE WORK STAND

(71) Applicants: Compagnie Generale des Etablissements Michelin, Clermont-Ferrand (FR); Michelin Recherche et Technique S.A., Granges-Paccot (CH)

(72) Inventors: Dennis D. Hodges, Lone Jack, MO (US); Zachary Alexander Merrill, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/923,563

(22) Filed: Oct. 27, 2015

(65) Prior Publication Data
US 2016/0046148 A1 Feb. 18, 2016

Related U.S. Application Data (63) Continuation of application No. 13/625,173, filed on Sep. 24, 2012, now Pat. No. 9,199,511.

(51) Int. Cl.
*B66F 7/24* (2006.01)
*B60B 30/02* (2006.01)
(Continued)

(52) U.S. Cl.
CPC .............. *B60B 30/02* (2013.01); *A47F 7/04* (2013.01); *B60B 30/00* (2013.01)

(58) Field of Classification Search
CPC ............. B66F 7/243; B66F 7/246; B66F 1/00; B66F 3/00
See application file for complete search history.

(56) References Cited

U.S. PATENT DOCUMENTS

| 2,542 A | 4/1842 | Brown et al. |
|---|---|---|
| 256,936 A | 4/1882 | Wicksteed |

(Continued)

FOREIGN PATENT DOCUMENTS

| GB | 375973 A | 7/1932 |
|---|---|---|
| GB | 2123368 A | 2/1984 |
| GB | 2202504 A | 9/1988 |

OTHER PUBLICATIONS http://www.harborfreight.com/motorcycle-wheel-cleaning-stand-98800.html (Web page dated Feb. 6, 2012).

*Primary Examiner* — Lee D Wilson
(74) *Attorney, Agent, or Firm* — John Steckler Schwab (57) ABSTRACT

A tire work stand comprises a frame for supporting the work stand on a ground surface and for attaching a set of components to the tire work stand. A plurality of rollers is attached to the frame to support a tire above the ground surface and to permit rotation of a tire during inspection of the tire. A ramp is configured to have a first ramp end capable of extending from the ground surface and a second ramp end extending to a position proximal to the frame. A bridge is configured to have a first bridge end extending from the second ramp end and a second bridge end extending to a position proximal to a surface of at least one of the rollers, wherein the bridge acts to inhibit rotation of the roller during loading of the tire and further permits rotation of the tire after the tire has been loaded on the tire work stand.

20 Claims, 7 Drawing Sheets

(51) Int. Cl.
*A47F 7/04* (2006.01)
*B60B 30/00* (2006.01)

(56) References Cited

U.S. PATENT DOCUMENTS

| | | | |
|---|---|---|---|
| 322,057 A | 7/1885 | Hart | |
| 342,187 A | 5/1886 | Cornell | |
| 350,243 A | 10/1886 | Gump | |
| 372,604 A | 11/1887 | Craig | |
| 556,758 A | 3/1896 | Lefebre, Jr. | |
| 556,789 A | 3/1896 | Walker | |
| 567,625 A | 9/1896 | Waterman | |
| 573,811 A | 12/1896 | Benton | |
| 653,048 A | 7/1900 | Wigg | |
| 698,231 A | 4/1902 | Starzman | |
| 1,047,048 A | 12/1912 | Harrison | |
| 1,131,477 A | 3/1915 | Crofoot | |
| 1,354,774 A | 10/1920 | Metzger | |
| 1,569,737 A | 1/1926 | Fording | |
| 1,628,306 A | 5/1927 | Clark | |
| 1,665,887 A | 4/1928 | Lind | |
| 1,901,360 A | 3/1933 | Snow | |
| 1,902,611 A | 3/1933 | Blackman | |
| 2,012,635 A * | 8/1935 | Paden | B66F 7/243 254/88 |
| 2,910,201 A | 10/1959 | Finn | |
| 3,107,915 A | 10/1963 | Looney | |
| 3,510,007 A | 5/1970 | Walklet et al. | |
| 3,812,974 A | 5/1974 | Sylvester | |
| 3,856,264 A | 12/1974 | Thumma | |
| 3,865,244 A | 2/1975 | Galen | |
| 4,140,191 A * | 2/1979 | Hickey | B60S 13/00 150/166 |
| 4,317,476 A | 3/1982 | Radzik | |
| 4,550,835 A | 11/1985 | Lynch | |
| 4,562,904 A | 1/1986 | Kelley | |
| 4,802,594 A | 2/1989 | Graber | |
| 4,913,615 A | 4/1990 | Ward | |
| 5,039,123 A | 8/1991 | Smeitink | |
| 5,069,348 A | 12/1991 | Long | |
| 5,248,235 A | 9/1993 | Poten et al. | |
| 5,626,241 A | 5/1997 | Holden | |
| 5,735,410 A | 4/1998 | Kallstrom | |
| 5,749,475 A * | 5/1998 | Krebs | A47F 7/04 211/175 |
| 5,944,198 A | 8/1999 | Ihalainen | |
| 5,988,402 A | 11/1999 | Mayfield | |
| D428,221 S * | 7/2000 | Johnson | D32/4 |
| 6,520,344 B2 | 2/2003 | Graham | |
| 6,540,470 B2 | 4/2003 | Johnson | |
| 6,575,310 B2 | 6/2003 | Chamoun | |
| 6,581,785 B1 | 6/2003 | Falkenstein | |
| 6,640,979 B1 | 11/2003 | Mayfield | |
| 6,755,309 B1 | 6/2004 | Runge | |
| 6,935,619 B2 | 8/2005 | Chamoun | |
| 7,150,359 B1 | 12/2006 | Lyons et al. | |
| 7,694,830 B1 | 4/2010 | Larson | |
| D640,854 S | 6/2011 | Leum | |
| 7,988,402 B2 | 8/2011 | Adams | |
| 8,002,122 B2 | 8/2011 | Kniegge | |
| 8,074,314 B2 | 12/2011 | Lucht | |
| 8,104,588 B2 | 1/2012 | Curlee et al. | |
| 8,256,053 B2 | 9/2012 | Astor et al. | |
| 9,056,640 B2 | 6/2015 | Vineyard | |
| 9,199,511 B2 * | 12/2015 | Hodges | B60B 30/00 |
| 2001/0023939 A1 | 9/2001 | Johnson | |
| 2001/0050260 A1 | 12/2001 | Graham | |
| 2002/0109130 A1 | 8/2002 | Chamoun | |
| 2003/0010729 A1 | 1/2003 | Lopez De Luzuriaga | |
| 2004/0046160 A1 | 3/2004 | Chamoun | |
| 2007/0138112 A1 | 6/2007 | Meyer | |
| 2007/0237613 A1 | 10/2007 | Randers | |
| 2009/0001031 A1 | 1/2009 | Hutchinson, II | |
| 2009/0016865 A1 | 1/2009 | Astor et al. | |
| 2009/0300859 A1 | 12/2009 | Lucht | |
| 2010/0065714 A1 | 3/2010 | Curlee et al. | |
| 2010/0092270 A1* | 4/2010 | Adams | B60B 29/002 414/427 |
| 2010/0202862 A1* | 8/2010 | Kniegge | G01M 17/0074 414/430 |
| 2012/0224940 A1 | 9/2012 | Andrews | |
| 2013/0270201 A1 | 10/2013 | Vineyard | |
| 2014/0084530 A1* | 3/2014 | Hodges | B60B 30/00 269/296 |

\* cited by examiner

TIRE WORK STAND

CROSS-REFERENCE TO RELATED APPLICATIONS

This application is a continuation of prior U.S. application Ser. No. 13/625,173 filed Sep. 24, 2012, the contents of which are hereby incorporated by reference.

FIELD OF THE INVENTION

The present invention relates to the cleaning, inspection, and maintenance of tires and wheels. Specifically, the present invention pertains to a tire work stand apparatus for rotating a tire, either mounted or unmounted, where the loading and unloading of the tire onto and off the work stand is eased by an automatic roller brake device.

BACKGROUND OF THE INVENTION

A tire work stand, and in particular a portable tire work stand, simplifies inspection of unmounted or mounted tires (especially useful for large, heavy truck tires). Tire work stands exist but their design do not facilitate easy loading and unloading, Portable roller stands having a typical ramp-style loading system are not satisfactory for use with a tire that is not attached to a vehicle. For example, US Patent Application Publication US 2010/020862 shows an apparatus for vehicle wheel maintenance having a pair of spaced apart rollers and a loading bar such that the rear wheel of a motorcycle can be rolled onto the stand such that the tire rests between the rollers. This allows rotation of the tire. US Patent Application Publication US 2007/0138112 A1 discloses a wheel rotation device having a pair of spaced apart rollers and an inclined ramp extending from one of the rollers at a shallow angle to promote loading the tire on the stand.

Upon scrutiny of these devices, however, it should become apparent that the dimensions of these devices would not allow them to be useful for inspection of heavy tires, like heavy duty truck tires. In particular, these devices are not satisfactory for use when the tire is not attached to a vehicle. The usual method of loading/unloading a heavy tire onto/from a portable roller stand is to include a ramped platform that can allow the tire to be rolled up/down a small incline which transitions between floor level and roller-top level. This method is satisfactory if the tire to to be inspected is mounted on a small vehicle (such as a motorcycle, for instance) that is being pushed onto the roller stand. In the case of loading an unmounted tire or tire and wheel assembly onto the tire work stand the force vectors to load the tire are opposite and lead to unsatisfactory performance for a tire not mounted on a vehicle. When the tire is pushed against the roller the tire imposes a force vector on the roller that is in the opposite rotation to the force vector imposed on the roller by the tire of a vehicle being pushed. As a result of this difference, a simple ramp is sufficient, for example, for a motorcycle roller stand. However, for a tire work stand, the force vector in the oppisite direction inhibits the ability of the tire to rise over the roller and to seat on the stand iteself A new type of device having a brake feature on the ramp to prevent rotation of the roller overcomes these defficiencies and makes it uniquely suited for use as a tire work stand. The concept would also work equally well for applications such as a as a motorcycle roller stand.

SUMMARY OF THE INVENTION

Aspects and advantages of the invention will be set forth in part in the following description, or may be obvious from the description, or may be learned through practice of the invention.

A tire work stand comprises a frame for supporting the tire work stand on a ground surface and for attaching a set of components of the tire work stand. A plurality of rollers is attached to the frame to support a tire above the ground surface and to permit rotation of the tire during inspection of the tire. The rollers are rotatable about an axis of rotation concentric with an axis of the rollers. A ramp is configured to have a first ramp end capable of extending from the ground surface and a second ramp end extending to a position proximal to the frame. A bridge is configured to have a first bridge end extending from the second ramp end and a second bridge end extending to a position proximal to a surface of at least one of the rollers, wherein the bridge acts to inhibit rotation of the roller during loading of the tire and further permits rotation of the tire after the tire has been loaded on the tire work stand.

The frame is in frictional contact with the ground surface to aid in the stability of the tire work stand. In one embodiment, the frame comprises a set of supports mounted to the frame and in frictional contact with the ground surface and arranged on the frame so as to provide a gap between the frame and the ground surface.

The ramp comprises a hinge located on the ramp to permit rotation of the ramp such that the first ramp end is movable from a position in contact with the ground surface to a position away from the ground surface.

A first bridge end of the tire work stand comprises a hinge to permit rotation of the second bridge end from a position in contact with the roller to a position away from the roller. The position of the hinge relative to the frame is adjustable so as to maintain a clearance between the tire and the bridge when the tire is in a position for inspection.

In another variation, the first bridge end is rigidly attached to the frame, and the second bridge end extends from the frame to a position proximal to a surface of at least one of the rollers, and wherein a gap between the second bridge end and the roller is maintained when no load is applied to the ramp.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1A:
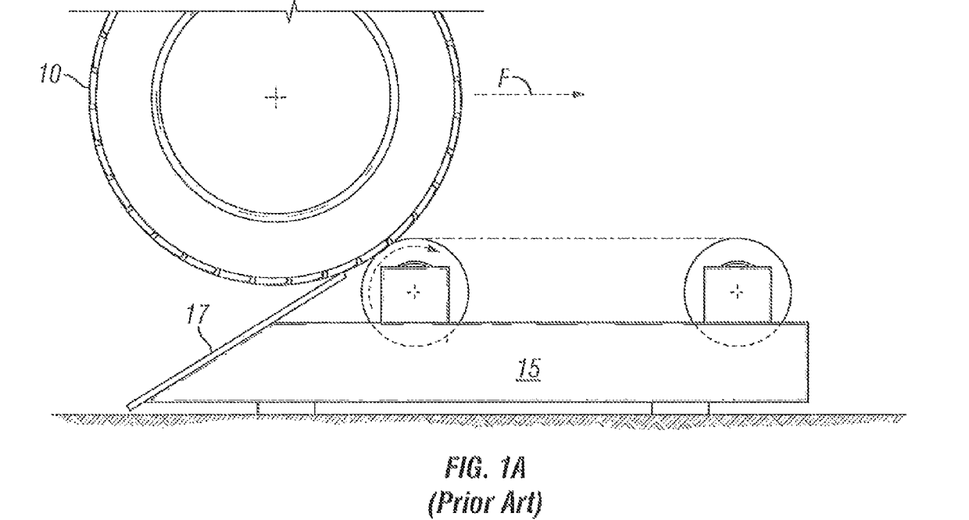
FIG. 1A is a schematic representation of a tire mounted on a wheel and the wheel mounted to a vehicle chassis showing the kinematics of the tire being loaded on a tire work stand according to the prior art.

A common requirement for the maintenance of tires and tire and wheel assemblies is to perform a visual inspection of the tire for signs of wear or injury that may make the tire unsuitable for further service. A tire work stand will typically comprise a frame that is comprises a pair of spaced apart and parallel aligned rollers. The rollers allow the tire to freely rotate for inspection. For small tires, it is possible to lift the tire directly onto the frame so that it rests on the rollers, but for heavy tires or tire and wheel assemblies, such as those used for heavy duty truck tires, it is not possible to lift the tire without assistance from a lifting device such as a hoist. FIG. 1 depicts a tire work stand 15 having a typical ramp-style loading system. When such a work stand is used with a tire mounted on a vehicle, it is easy to load the tire onto the stand. In this case the force F to move the tire is applied from the vehicle frame at the axis of rotation of the tire (i.e. the axle). As the tire leaves the ramp 17 and crosses the roller, the force continues to urge the tire forward and onto the work stand.

Figure 1B:
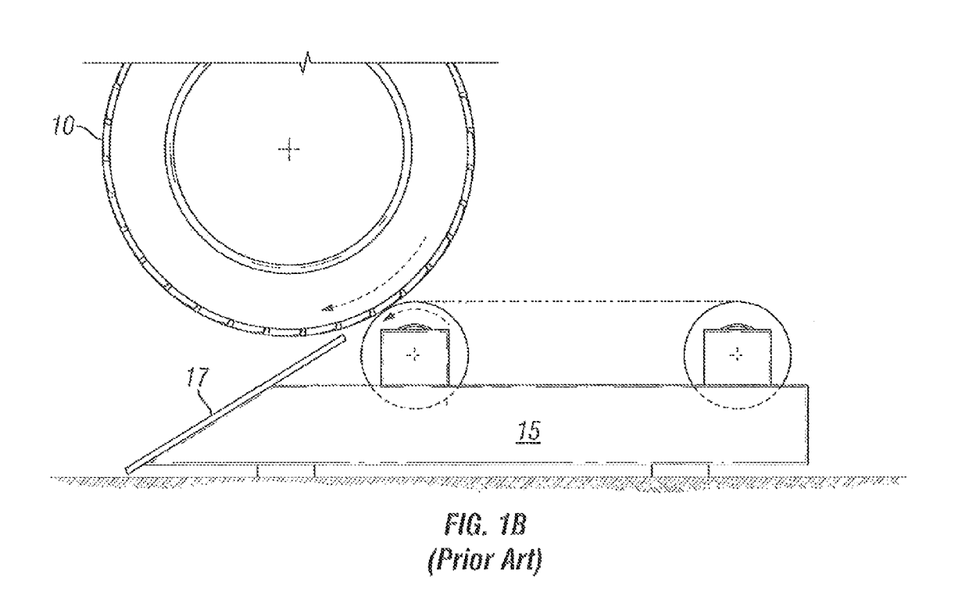
FIG. 1b is a schematic representation of a tire mounted on a wheel and the wheel not mounted to a vehicle chassis showing the kinematics of the tire being loaded on a tire work stand according to the prior art.

When one attempts to load a tire that is not attached to a vehicle onto a tire work stand, the forces are very different. In most cases, an operator will push on the tread of the tire to cause a torque to rotate the tire and have it ascend the ramp 17 and to approach the roller. This torque represented by the dotted arrow on the tire in FIG. 1B. The roller is configured to freely rotate about its axis. At the moment where the tire's contact with the ramp ends and the tire is in contact with the roller, the torque applied to the tire will now be transferred to the roller, which will freely rotate, as represented by the dotted arrow on the roller in FIG. 1B. The result is that the tire will no longer move forward to seat between the pair of rollers. The operator may be forced to try to lift the tire into place.

Figure 2:
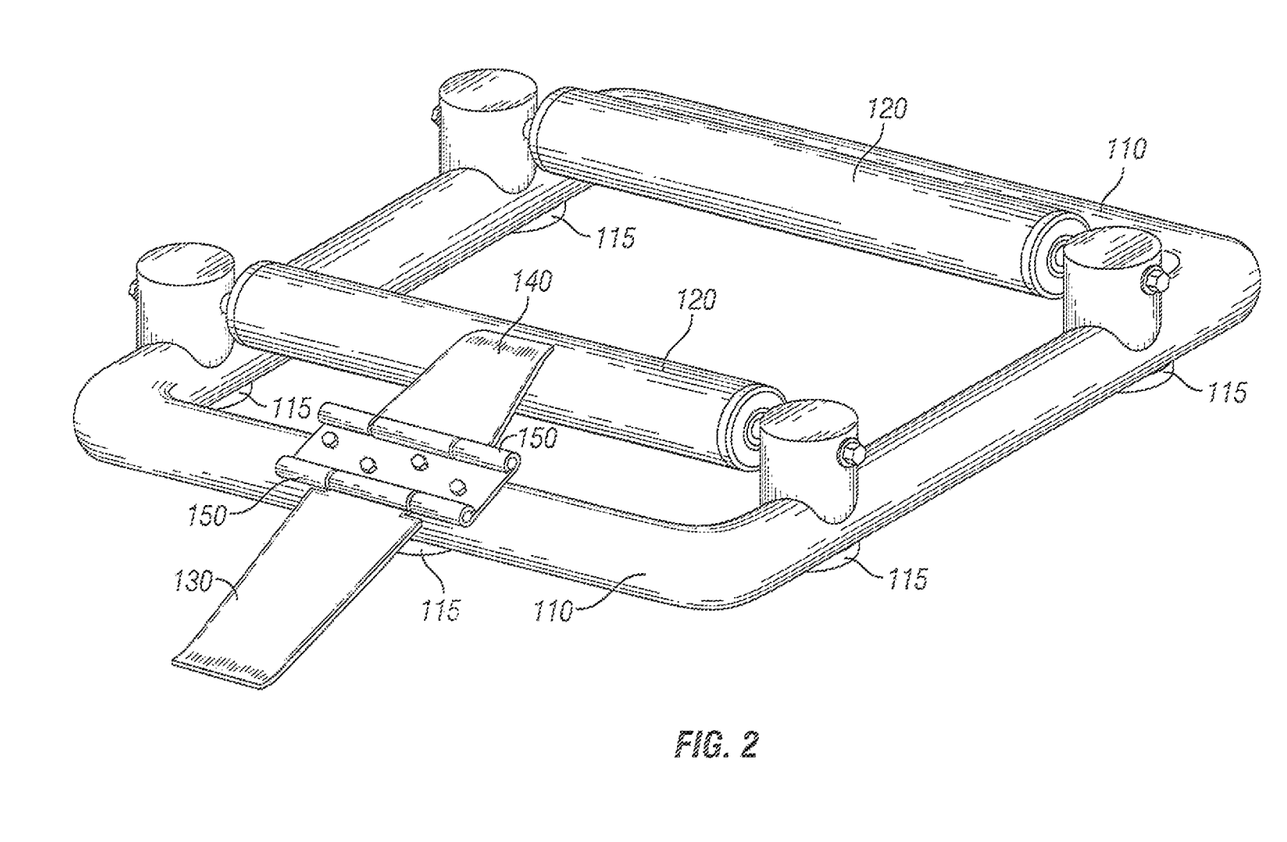
FIG. 2 is a perspective view of an embodiment of the tire work stand according to the invention.
Figure 3:
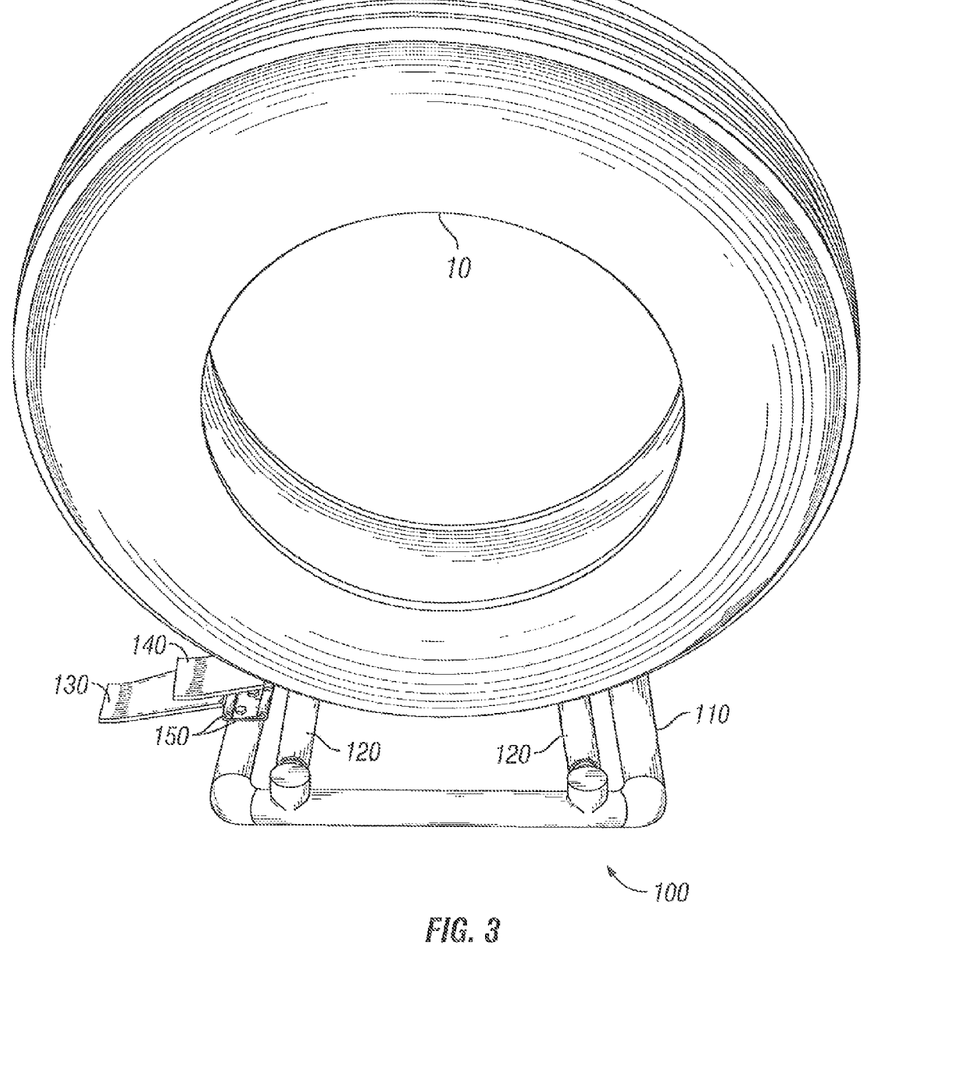
FIG. 3 is a side view of a tire loaded onto the tire inspection shown in FIG. 2.
Figure 4:
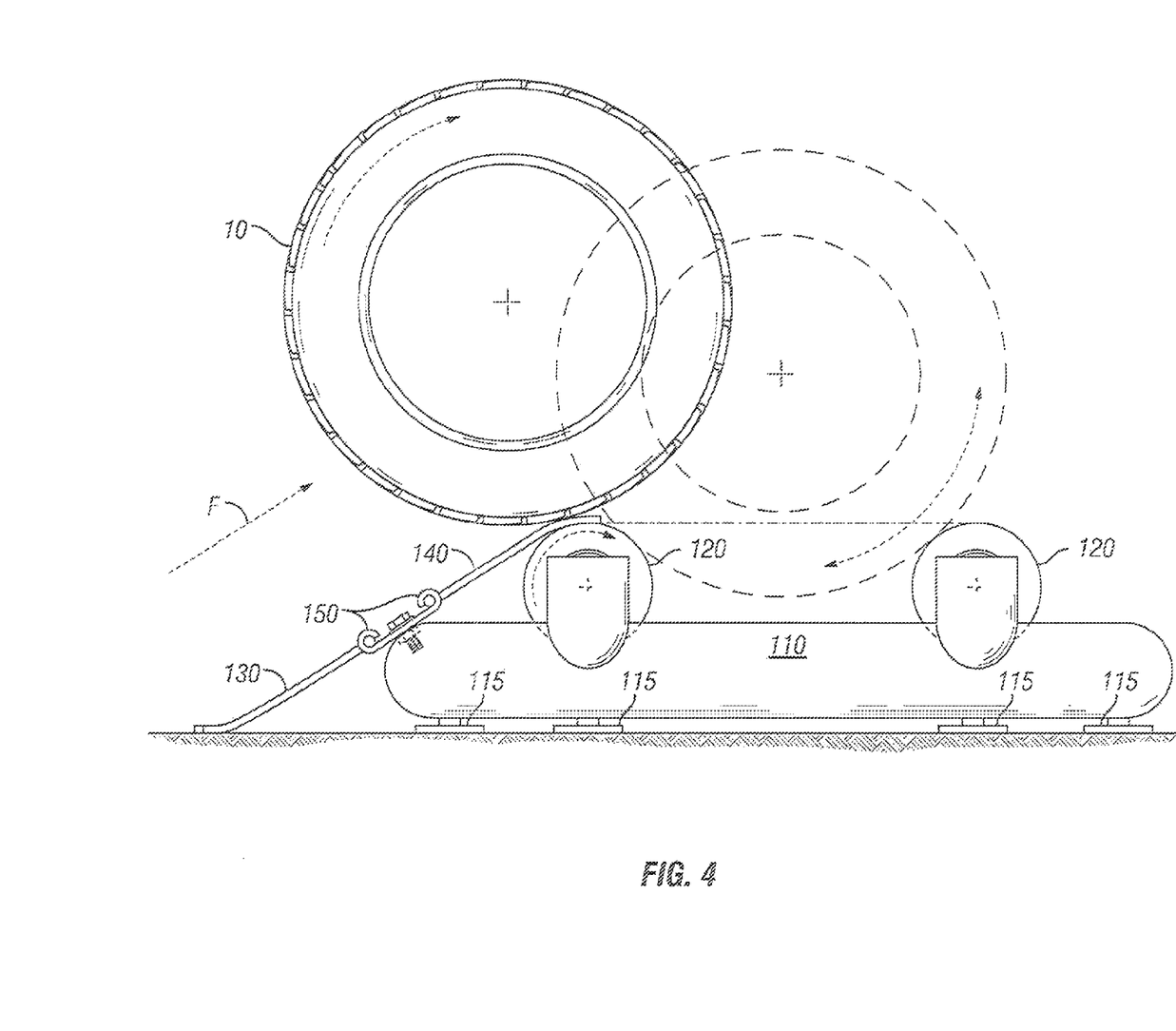
FIG. 4 is an illustration of a tire being loaded onto the tire work stand, depicting the operation of the bridge.

An embodiment of an improved tire work stand 100 is shown FIG. 2. The tire work stand 100 comprises a frame for supporting the work stand 100 on a ground surface and for attaching a set of components of the tire work stand. A plurality of rollers 120 are attached to the frame to support a tire 10 above the ground surface and to permit rotation of a tire during work or inspection of the tire 10. To facilitate loading of the tire 10 on the tire work stand 100, the stand has a ramp 130 with a first ramp end 131 capable of extending from the ground surface, and a second ramp end 132 extending to a position proximal to the frame 110. As used herein, the term "ramp" refers to any means of providing a surface to facilitate rolling the tire onto the work stand. The ramp 130 may be linear, curved, or even stepped. The surface of the ramp may be smooth or may also include a friction enhancing surface. Further, the tire work stand 100 has a bridge 140 having a first bridge end 141 extending from the portion of the frame 110 proximal to the second ramp end 132, and a second bridge end 142 extending to a position proximal to the surface of at least one of the rollers 120. As used herein, the term "bridge" refers to any means of providing a surface to facilitate rolling the tire onto the work stand 100. The bridge 140 may be linear, curved, or even stepped. The surface of the bridge 140 may be smooth or may also include a friction enhancing surface. Referring now to FIG. 3 and to FIG. 4, when the tire 10 ascends the ramp 130 and the bridge 140, the weight of the tire on the bridge 140 causes the second bridge end 142 to contact the surface of the roller 120 and to inhibit rotation of the roller 120. See FIG. 4 where the tire 10 shown in solid lines is about to crest over the roller 120. Since the roller 120 will no longer rotate, the tire 10 will easily mount the roller 120 and reach the loaded position where the tire 10 rests in contact with both rollers 120. Referring in particular to FIG. 4, tire 10 is depicted in the loaded position by dotted lines. Once the weight of the tire no longer rests on the second bridge end 142, the roller 120 proximate to it is now free to rotate. The tire 10 is now free to rotate to facilitate inspection or maintenance.

Figure 5:
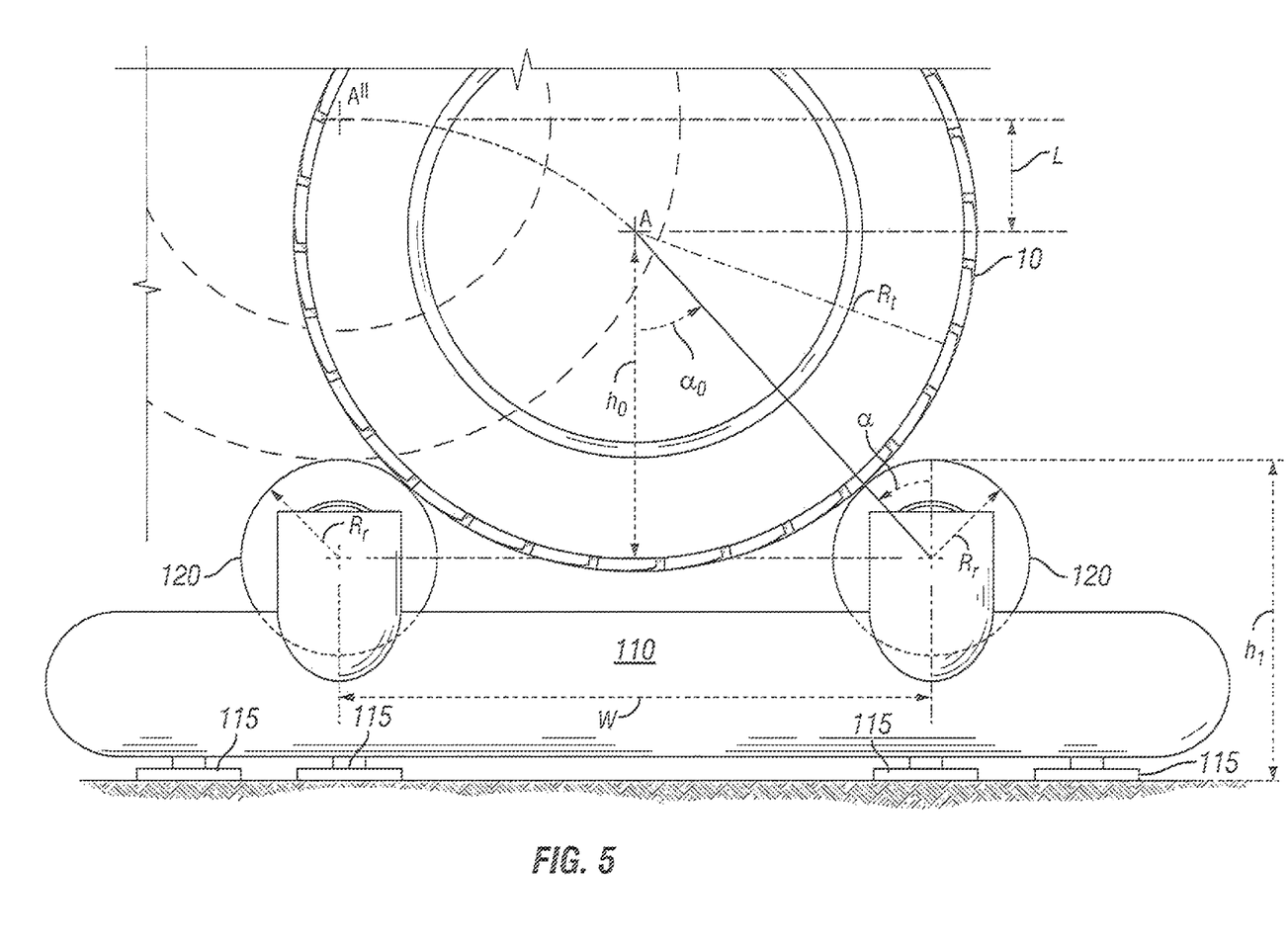
FIG. 5 depicts a tire in the process of loading onto the tire work stand (dashed lines) in relation to a tire loaded onto the tire work stand (solid lines).

Referring now to FIG. 5, it can be seen that in the absence of the bridge 140 (as is the case in the prior art), the tire 10 undergoes a vertical displacement or lift L between the position where the tire 10 is in the crest of roller 120 and the position where the tire 10 is loaded, or rests between the pair of rollers 120. Specifically the axis of tire 10 moves from a position A when loaded to a position A" when resting on the crest of the roller 120. During this movement of the axis it the tire 10, the roller 120 is free to rotate and increases the difficulty to unload the tire 10 from the work stand 100. In the loaded position, the position A is a vertical distance equal to $h_0$ above a line passing through the axes of rotation of the rollers 120. In the unloading position, the position A" is a vertical distance $(R_T+R_R)$ above a line passing through the axes of rotation of the rollers 120. The lift L may be determined from the dimensions of the work stand 100 and from the dimension of the tire 10:

$$L=(R_T+R_R)-h_0 \text{ and } h_0^2=(R_T+R_R)^2-(W/2)^2$$

where:

$R_T$=radius of the tire 10

$R_R$=radius of the roller 120

W=spacing between the rollers 120 as mounted on the frame 110

For the ease of loading of the tire, and more importantly, for the ease of unloading the tire, the lift L should be minimized. For a work stand as known in the prior art, the tire will undergo the full lift L during loading and unloading. To accomplish this, the tire must be rotated through and angle $\alpha_0$ defined (and illustrated in FIG. 4) as the angle measure from the 12 o'clock position on the roller 120 and a point located at the point of contact between the tire 10 and the roller 120. For the tire work stand of the prior art, the angle $\alpha_0$ may be determined as:

$$\alpha_0=\sin^{-1}[W/(2\cdot(R_T+R_R)]$$

For a tire work stand 100 that is dimensionally sized to accommodate a typical heavy truck tire of size 275/80R22.5, the tire 10 will have a diameter of about 1018 mm ($R_T$=509 mm) and the roller 120 will have a diameter of about 50 mm ($R_R$=25 mm), spaced apart about by a distance W=400 mm. Applying these date to the equations above obtains the a value of L≈495 mm, a value of $h_0$≈39 mm and a value of $\alpha_0$≈22 degrees.

Figure 6:
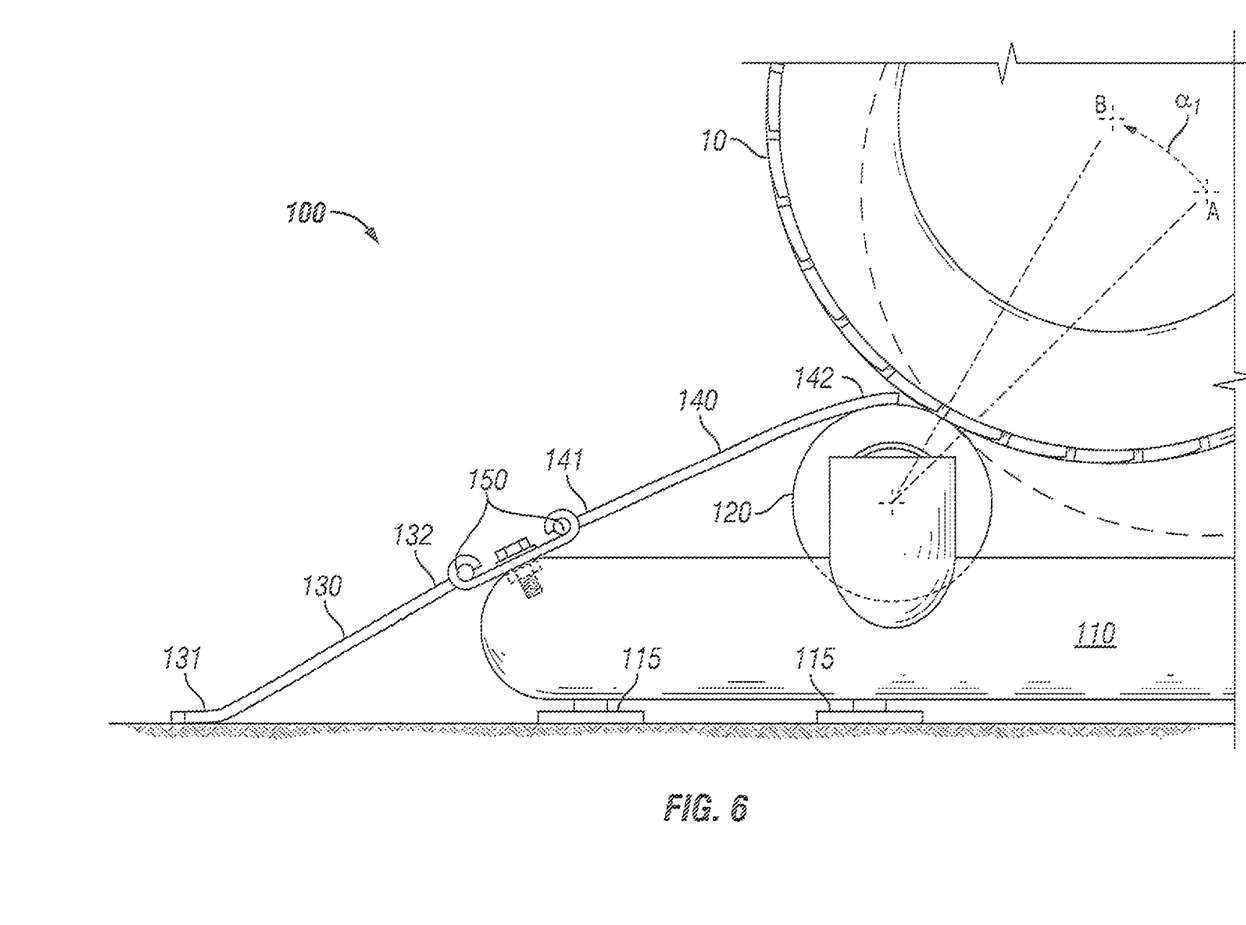
FIG. 6 depicts a tire loaded onto the tire work stand with the bridge positioned in a position for loading or unloading of the tire.

Turning now to FIG. 6, it can be appreciated that the roller 120 will be inhibited from turning as soon as the tire 10 contacts the second bridge end 142. That is to say, the axis of tire 10 moves from a position A when loaded to a position B when the tire 10 contacts the second bridge end 142. In this interval between the position A and the position B, the tire 10 now undergoes a rotation angle $\alpha_1$ which is much less than $\alpha_0$. The reduction of this angle facilitates easy removal of the tire 10 from the work stand 100. The clearance between the second bridge end 142 and the tire can be made small or near zero. In that case, a small rotation of the tire 10 will cause it to immediately contact the second bridge end 142 and inhibit the rotation of the roller 120. For practical design considerations and to accommodate tires of different diameter, it is advantageous to maintain a small clearance between the tire 10 (when loaded) and the second bridge end 142. This is illustrated in FIG. 6 where the second bridge end 142 ends just clear of the tread of the tire 10. To further accommodate multiple tire sizes, the position of the hinge relative to the frame can be made adjustable so as to maintain a clearance between the tire and the bridge when the tire is in a position for inspection.

Referring again to FIG. 6, an embodiment of the tire work stand 100 is shown where the ramp 130 is rotatable to permit rotation of the ramp 130 such that the first ramp end 131 moves from a position in contact with the ground surface to a position away from the ground surface. It can be appreciated from FIG. 6 that when the ramp 130 is rotated to its full clockwise position, then the tire work stand 100 becomes more compact for storage or transportation. In this non-limiting example as shown in FIG. 6, the hinge 150 as a simple gate hinge. However, it is within the scope of the invention for the hinge 150 to be any means that provides suitable freedom of rotation of the ramp 130. The hinge 150 is attached to the frame 110 by means of bolts and nuts. However, the hinge 150 may be attached to the frame 110 by any suitable means such as welding, bonding, or may be fabricated as an integral part of the frame 110.

FIG. 6 also depicts an additional detail of the tire work stand 100 where the bridge 140 is rotatable to permit rotation of the bridge 140 such that the second bridge end 142 moves from a position proximal to or in contact with the roller 120 to a position away from the roller. A hinge 150 located on the second ramp end 132 to permit such rotation. FIG. 3 depicts the work stand 100 with the bridge 140 in the counterclockwise rotated position. It can be seen that this movement of the bridge 140 ensures that it will not interfere with the rotation of the roller 120 as the tire 10 is rotated during inspection or maintenance. In this non-limiting example as shown in FIG. 6, the hinge 150 is a simple gate hinge. However, it is within the scope of the invention for the hinge 150 to be any means that provides suitable freedom of rotation of the bridge 140. The hinge 150 is attached to the frame 110 by means of bolts and nuts. However, the hinge 150 may be attached to the frame 110 by any suitable means such as welding, bonding, or may be fabricated as an integral part of the frame 110.

Figure 7A:
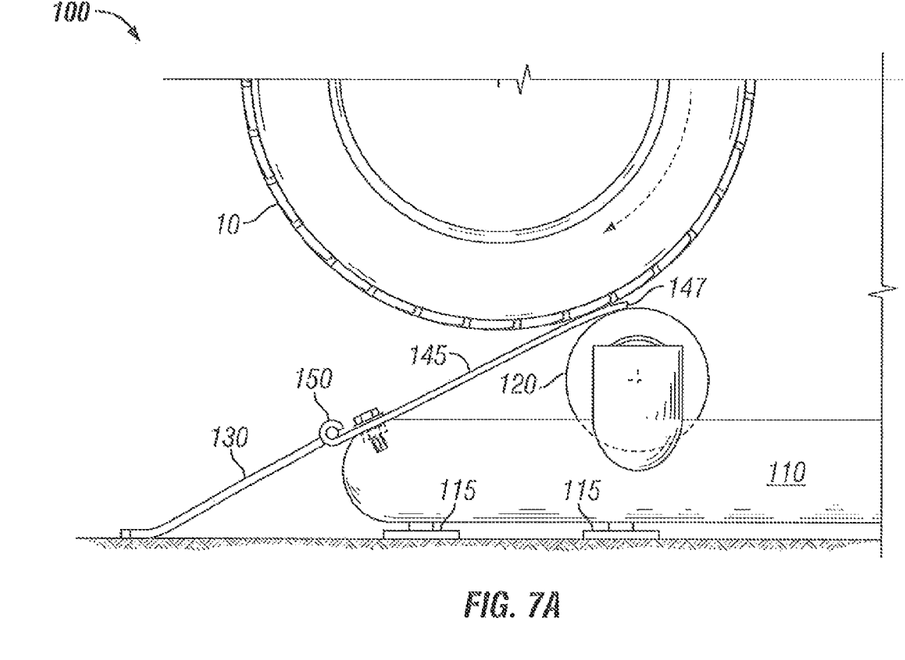
FIG. 7A depicts a tire being loaded onto an additional embodiment of the tire work stand, where the bridge is rigidly attached to the frame.
Figure 7B:
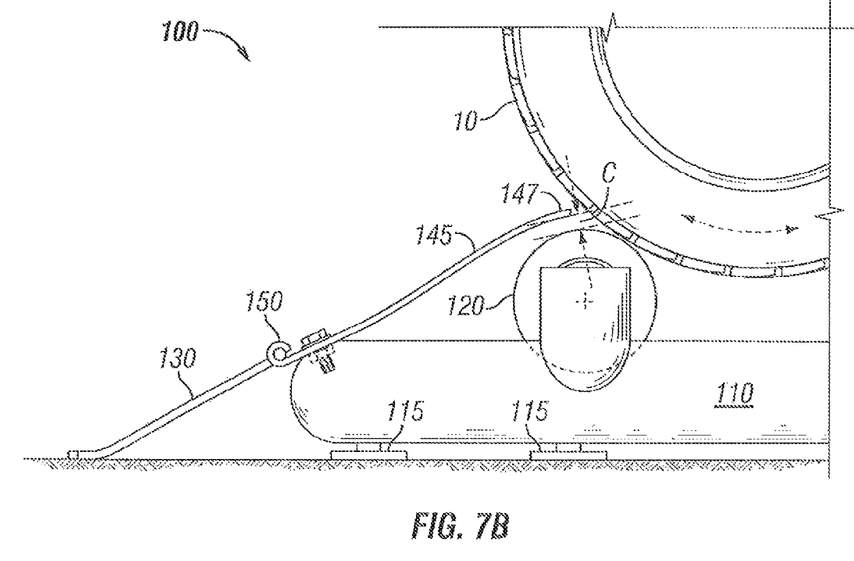
FIG. 7B depicts a tire loaded onto an additional embodiment of the tire work stand of FIG. 7A, showing the operation of the bridge.

Referring now to FIG. 7a and to FIG. 7B, an alternative embodiment is shown where the bridge 145 is rigidly attached to the frame and the second bridge end 147 extends from the frame to a position proximal to a surface of at least one of the rollers. In this embodiment, the bridge acts as a spring member to maintain a gap C between the second bridge end 147 and the roller 120 when no load is applied to the bridge. The size of the gap C is not critical, but should be at least 2-3 mm to unsure that the tire 10 and roller 120 are free to rotate during inspection or maintenance of the tire 10. During the operation of loading of the tire 10, the force applied to the bridge 145 by the weight of the tire 10 will cause the second bridge end 147 to contact the roller 120 and to inhibit rotation of the roller 120. This embodiment maintains the ramp 130 that is rotatable.

In still another embodiment (not shown), the ramp 130 and the bridge 145 may comprise a unitary component which may be rigidly attached to the frame 110 as for the bridge 145 depicted in FIGS. 7A and 7B. The ramp 130 and the bridge 145 are a single unit. This unit may be made removable from the frame 110 by means of tabs and slots or any means to provide positive location of the unit on the frame 110. Thus the advantages of ease of use and portability are maintained.

The dimensions of the tire work stand 100 may be specified to accommodate different sizes and types of tires. For example, the axial length of the rollers, and hence, the width of the frame 110, would be specified according to the tread width of the tire 10. For the embodiments shown in the attached Figures, the rollers 120 have a cylindrical shape and the radius $R_R$ of the rollers is constant along an axial length of the rollers 120. However, if the tire 10 has a very round cross-section to its tread, as often found on motorcycle tires, then the rollers 120 may have cylindrical shape and a radius of the rollers is variable along an axial length of the rollers. For a motorcycle tire, it may be advantageous to have the minimum radius in the center of that length of the roller 120 to urge the tire to self-center on the rollers 120. The rollers 120 used for a prototype tire work stand 100 are of a ball bearing construction and have a diameter between 40 mm and 60 mm. The diameter may be varied; for example, increased to obtain higher load capacity for larger tires.

To solidly locate the tire work stand 100 on the ground surface, it will be advantageous for a bottom surface of the frame to be in frictional contact with the ground surface. To accomplish this, a set of supports 115 may be mounted to the frame 110 and in frictional contact with the ground surface and arranged on the frame 110 so as to provide a gap between the frame and the ground surface.

The longitudinal length of the tire work stand 100 is determined by the range of tire diameters for which the work stand 100 will be used, as well as the need to maintain a gap between the frame and the ground surface. It is apparent from FIG. 5 that the distance from the ground surface to the axis of rotation of the tire A must be greater than the distance $h_0$ shown in FIG. 5 and which may be calculated from the following equation:

$h_0^2 = (R_T + R_R)^2 - (W/2)^2$ where:
RT=radius of the tire 10
RR=radius of the roller 120
W=spacing between the rollers 120 as mounted on the frame 110

The gap between the ground surface may be altered by changing the height above the ground at which the rollers 120 are mounted or by altering the vertical dimension of the supports 115. The tire work stand 100 may more readily accept different sizes of tires when the frame 110 is adjustable to vary the length W between the axes of rotation of the rollers 120 (not shown). For the example tire 10 of size 275/80R22.5, the longitudinal distance W between the axes of rotation of the rollers 120 is about 400 mm. This dimension has been found to work effectively for a range of tire sizes that includes motorcycle tires through small earthmover tires. The important element is that the tire 10 does not interfere with the bridge 140 when the tire 10 is loaded onto the tire work stand 100. This can be avoided with either by adjusting the spacing W between the rollers 120 or adjusting the position of second bridge end 142 relative to the roller 120. The frame 110 can be made adjustable by a variety of means. For example, the elements of the frame 110 can be made telescopic to allow adjustability.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A tire work stand comprising;
   a frame for supporting the tire work stand on a ground surface and for attaching a set of components to the tire work stand;
   a plurality of rollers attached to the frame to support a tire above the ground surface and to permit rotation of the tire during inspection of the tire, the rollers being rotatable about an axis of rotation concentric with an axis of the rollers;
   a ramp having a first ramp end capable of extending from the ground surface and a second ramp end extending to a position proximal to the frame, and
   a bridge having a first bridge end extending from the second ramp end and a second bridge end extending to a position higher than the crest of, above and proximal to a surface of at least one of the rollers, wherein the bridge acts to inhibit rotation of the roller during loading of the tire and further permits rotation of the tire after the tire has been loaded on the tire work stand.

2. The tire work stand according to claim 1, wherein a bottom surface of the frame is in frictional contact with the ground surface.

3. The tire work stand according to claim 2, further comprising a set of supports mounted to the frame and in frictional contact with the ground surface and arranged on the frame so as to provide a gap between the frame and the ground surface.

4. The tire work stand according to claim 1, wherein the second bridge end is positioned relative to the tire to maintain a clearance between the tire and the bridge when the tire is in a position for inspection.

5. The tire work stand according to claim 1, wherein the first bridge end further comprises a hinge to permit rotation of the second bridge end from a position in contact with the roller to a position away from the roller.

6. The tire work stand according to claim 5, wherein the position of the hinge relative to the frame is adjustable so as to maintain a clearance between the tire and the bridge when the tire is in a position for inspection.

7. The tire work stand according to claim 1, wherein the ramp further comprises a hinge located at the second ramp end and the ramp is rotatable about an axis of the hinge such that the first ramp end is movable from a position in contact with the ground surface to a position away from the ground surface.

8. The tire work stand according to claim 1, wherein the bridge is rigidly attached to the frame and the bridge extends from the frame to a position proximal to a surface of at least one of the rollers, and wherein a gap between the second bridge end and the roller is maintained when no load is applied to the bridge.

9. The tire work stand according to claim 8, wherein the bridge and the ramp comprise a unitary component.

10. The tire work stand according to claim 1, wherein the rollers have a cylindrical shape and a radius of the rollers is constant along an axial length of the rollers.

11. The tire work stand according to claim 1, wherein the rollers have a cylindrical shape and a radius of the rollers is variable along an axial length of the rollers.

12. The tire work stand according to claim 1, wherein the rollers have a diameter between 40 mm and 60 mm.

13. A tire work stand comprising;
    a frame for supporting a tire work stand on a ground surface and for attaching a set of components to the tire work stand;
    a plurality of rollers attached to the frame to support a tire above the ground surface and to permit rotation of a tire during inspection of the tire, the rollers being rotatable about an axis of rotation concentric with an axis of the rollers;
    a ramp having a first ramp end capable of extending from the ground surface and a second ramp end extending to a position proximal to the frame;
    a bridge having a first bridge end extending from the second ramp end and a second bridge end extending to a position higher than the crest of, above and proximal to a surface of at least one of the rollers, wherein the bridge acts to inhibit rotation of the roller during loading of the tire and further permits rotation of the tire after the tire has been loaded on the tire work stand; and
    wherein the position of the hinge relative to the frame is adjustable so as to maintain a clearance between the tire and the bridge when the tire is in a position for inspection.

14. A tire work stand comprising;
    a frame for supporting the tire work stand on a ground surface and for attaching a set of components to the tire work stand;
    a plurality of rollers attached to the frame to support a tire above the ground surface and to permit rotation of the tire during inspection of the tire, the rollers being rotatable about an axis of rotation concentric with an axis of the rollers;
    a ramp having a first ramp end capable of extending from the ground surface and a second ramp end extending to a position proximal to the frame, and
    a bridge having a first bridge end extending from the second ramp end and a second bridge end extending to a position above and proximal to a surface of at least one of the rollers, whereby when loading the tire into the tire work stand, the tire passes the crest of the at least one of the rollers prior to clearing the second bridge end, whereby the bridge acts to inhibit rotation of the roller during loading of the tire and further permits rotation of the tire after the tire has been loaded on the tire work stand.

15. The tire work stand according to claim 1, wherein the second bridge end is positioned relative to the tire to maintain a clearance between the tire and the bridge when the tire is in a position for inspection.

16. The tire work stand according to claim 1, wherein the first bridge end further comprises a hinge to permit rotation of the second bridge end from a position in contact with the roller to a position away from the roller.

17. The tire work stand according to claim 5, wherein the position of the hinge relative to the frame is adjustable so as to maintain a clearance between the tire and the bridge when the tire is in a position for inspection.

18. The tire work stand according to claim 1, wherein the ramp further comprises a hinge located at the second ramp end and the ramp is rotatable about an axis of the hinge such that the first ramp end is movable from a position in contact with the ground surface to a position away from the ground surface.

19. The tire work stand according to claim 1, wherein the bridge is rigidly attached to the frame and the bridge extends from the frame to a position proximal to a surface of at least one of the rollers, and wherein a gap between the second bridge end and the roller is maintained when no load is applied to the bridge.

20. The tire work stand according to claim 8, wherein the bridge and the ramp comprise a unitary component.

* * * * *